US007020789B2

(12) United States Patent
Sperber et al.

(10) Patent No.: US 7,020,789 B2
(45) Date of Patent: Mar. 28, 2006

(54) PROCESSOR CORE AND METHODS TO REDUCE POWER BY NOT USING COMPONENTS DEDICATED TO WIDE OPERANDS WHEN A MICRO-INSTRUCTION HAS NARROW OPERANDS

(75) Inventors: Zeev Sperber, Zichron Yaakov (IL); Ittai Anati, Haifa (IL); Yuval Bustan, Moshav Mismeret (IL); Sagi Lahav, Kiryat Motzkin (IL)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 10/334,115

(22) Filed: Dec. 31, 2002

(65) Prior Publication Data

US 2004/0128573 A1 Jul. 1, 2004

(51) Int. Cl.
*G06F 1/32* (2006.01)

(52) U.S. Cl. ........................................ 713/324; 713/320

(58) Field of Classification Search ................ 713/320, 713/322, 323, 324; 712/42, 43, 210, 229
See application file for complete search history.

(56) References Cited

U.S. PATENT DOCUMENTS 5,935,237 A * 8/1999 Chiba et al. .................. 712/42
6,745,336 B1 * 6/2004 Martonosi et al. .......... 713/340

* cited by examiner

*Primary Examiner*—Thomas Lee
*Assistant Examiner*—Paul Yanchus, III
(74) *Attorney, Agent, or Firm*—Pearl Cohen Zedek Latzer LLP

(57) ABSTRACT

In some embodiments of the present invention, one or more elements of a processor core may receive a signal indicating that operands of a micro-instruction are narrow, for example less than or equal to 32 bits. In response to this signal, one or more components of a processor core element that are able to handle more than 32 bits of data (e.g. operands or results) may function as though they handle only 32 bits of data.

26 Claims, 3 Drawing Sheets

PROCESSOR CORE AND METHODS TO REDUCE POWER BY NOT USING COMPONENTS DEDICATED TO WIDE OPERANDS WHEN A MICRO-INSTRUCTION HAS NARROW OPERANDS

BACKGROUND OF THE INVENTION

Computer designs may be directed to save energy. In particular, in portable devices the length of the battery life is of importance. One area in which a designer may deal with power saving is the operation of the processor core.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
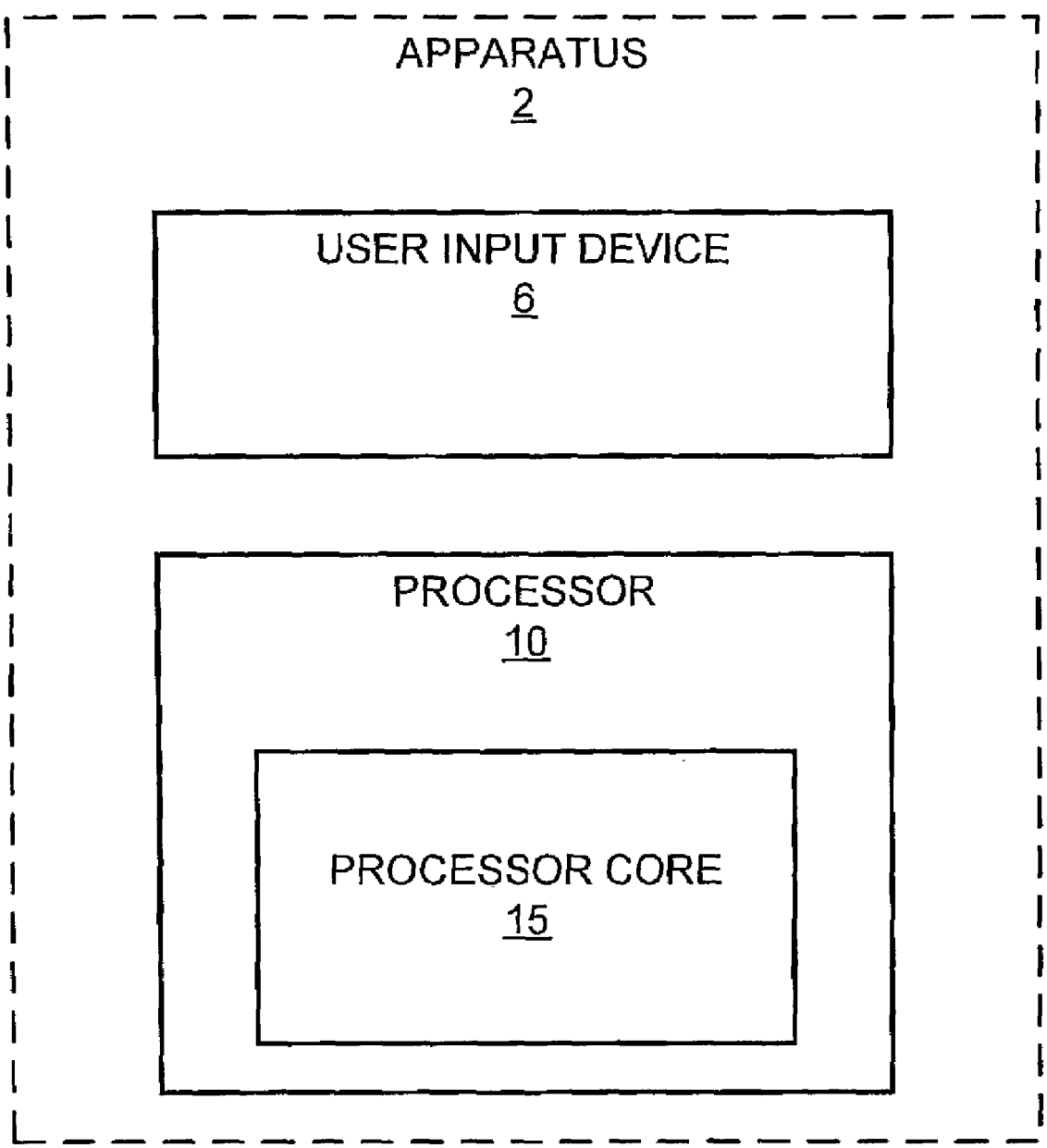
FIG. 1 is a simplified block diagram of an apparatus comprising a processor in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

It should be understood that the present invention may be used in any apparatus having a processor. Although the present invention is not limited in this respect, the apparatus may be a portable device that may be powered by a battery. Non-limiting examples of such portable devices include laptop and notebook computers, mobile telephones, personal digital assistants (PDA), and the like. Alternatively, the apparatus may be a non-portable device, such as, for example, a desktop computer.

As shown in FIG. 1, an apparatus 2 may comprise a processor 10 according to some embodiments of the present invention. Although the present invention is not limited in this respect, processor 10 may be, for example, a central processing unit (CPU), a digital signal processor (DSP), a reduced instruction set computer (RISC), a complex instruction set computer (CISC) and the like. Moreover, processor 10 may be part of an application specific integrated circuit (ASIC).

Apparatus 2 may optionally comprise a user-input device 6, such as, for example, a fill or partial keyboard, a touchpad, a trackball, a touch screen, a microphone, a dial pad, and the like.

Processor 10 may comprise a processor core 15 to receive macro-instructions, decode them into micro-instructions and execute them. Design considerations, such as, but not limited to, processor performance, cost and power consumption, may result in a particular processor core design. Although the scope of the present invention is not limited to this embodiment, processor core 15 may be designed for out-of-order execution of micro-instructions, i.e. micro-instructions may be executed according to availability of operands and execution resources inside processor core 15 and not necessarily according to the order in which they were generated from the macro-instruction. In some cases, a micro-instruction generated from a particular macro-instruction may be executed after a micro-instruction generated from a later macro-instruction.

Figure 2:
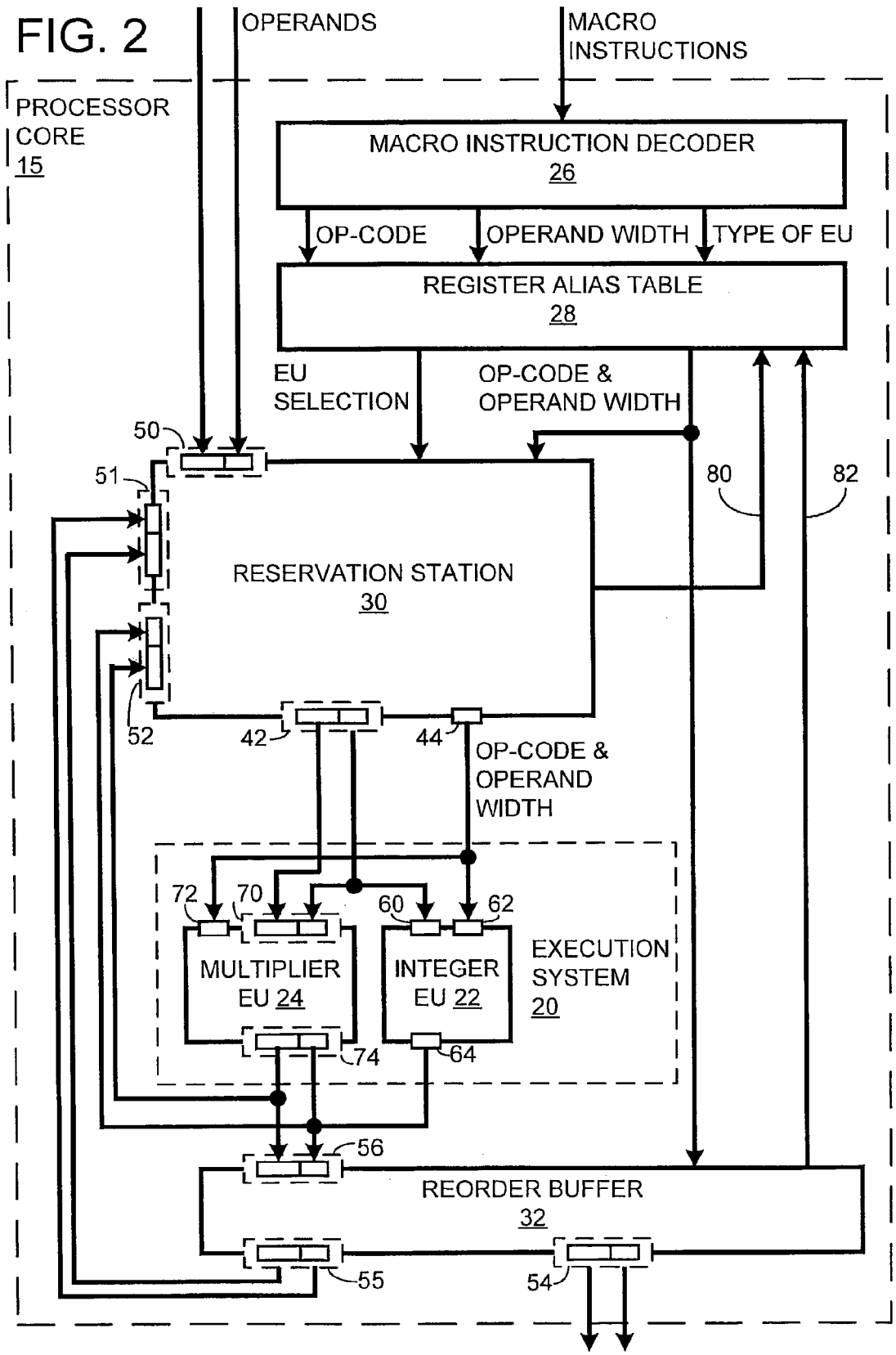
FIG. 2 is a simplified block-diagram illustration of a processor core according to some embodiments of the present invention.

FIG. 2 is a simplified block-diagram illustration of an exemplary embodiment for processor core 15, in accordance with some embodiments of the present invention. Well-known components and circuits of processor core 15 are not shown in FIG. 2 so as not to obscure the invention.

Processor core 15 may comprise a macro-instruction decoder 26 and an execution system 20. Execution system 20 may comprise an integer EU 22 and a multiplier EU 24. For the purpose of out-of-order execution of micro-instructions, processor core 15 may also comprise a register alias table 28, a reservation station 30, and a reorder buffer 32.

Macro-instructions may be received into processor core 15 in a particular order. Processor core 15 may execute the macro-instructions in order or out of order and may produce results for each macro-instruction in the same order they were received.

Macro-instruction decoder 26 may receive macro-instructions and decode each macro-instruction into one or more micro-instructions, depending upon the type of the macro-instruction. A micro-instruction is an operation to be executed by one of the EUs in execution system 20. Each micro-instruction may comprise operands and an op-code, where "op-code" is a field of the micro-instruction defining the type of operation to be performed on the operands. A single macro-instruction may be decoded into micro-instructions of different types, each to be executed by a corresponding type of EU. Macro-instruction decoder 26 may also generate signals indicating the width of the operands and the type of EU for executing the micro-instruction.

Register alias table 28 may be coupled to macro-instruction decoder 26 and may receive from it the op-codes and the signals indicating the width of the operands and the type of EU required for executing the micro-instructions, in the same order that they were generated from the macro-instructions.

Register alias table 28 may decide which of the EUs of execution system 20 is to execute the micro-instruction. After making this decision, register alias table 28 may forward the op-code and the signals indicating the operand width to reservation station 30 and to reorder buffer 32. In addition, register alias table 28 may forward signals indicating the selected EU to reservation station 30.

Reservation station 30 may store internally the op-code, the EU information and the operand width information. Reservation station 30 may then wait until the operands for the micro-instruction are available. Operands may be received by reservation station 30 from a front end via a port 50 or from reorder buffer 32 via a port 51. For some micro-instructions, one or more operands may be received by reservation station 30 from execution system 20 via a port 52 as execution results of other micro-instructions. Each operand received is stored together with the corresponding op-code, and when all operands are available, and the required EU is available, reservation station 30 may dispatch the micro-instruction to the designated EU via ports 42 and 44. Port 44 may carry the op-code and additional operand-width information to the EU, and port 42 may carry the corresponding operands.

Reservation station 30 may store and handle more than one micro-instruction at a time. The conditions for execution of one micro-instruction may be fulfilled before the conditions for execution of an micro-instruction that was received earlier. Consequently, micro-instructions may be executed in an order that may be different from the order in which macro-instruction decoder 26 generated them.

Reorder buffer 32 may be used to receive execution results from execution system 20 via a port 56 and to reorder them according to the original order of micro-instructions. To do so, reorder buffer 32 may receive and store the op-codes from register alias table 28 in a queue, in the same order they are sent to reservation station 30. In addition, reorder buffer 32 may store also the corresponding operand width information along with the op-code. Reorder buffer 32 may then receive execution results from execution system 20 and may store each result in the queue according to the original order of micro-instructions. When execution results become available for the micro-instruction in the queue that is next to be released, reorder buffer 32 may output these execution results to the retired register file of processor core 15 via a port 54 or to reservation station 30 via a port 55.

Integer EU 22 may receive operands of up to 32 bits of a micro-instruction at an input source port 60 and the op-code and operand width information of the micro-instruction at an input command port 62, and may execute the micro-instruction and output the result of up to 32 bits via an output result port 64. Output port 64 of integer EU 22 may be coupled to input port 56 of reorder buffer 32 and to input port 52 of reservation station 30 to send them these results.

Multiplier EU 24 may receive operands of up to 86 bits of a micro-instruction at an input source port 70 and the op-code and operand width of the micro-instruction at an input command port 72, and may execute the micro-instruction and output the result of up to 86 bits via an output result port 74. Output port 74 of multiplier EU 24 may be coupled to input port 56 of reorder buffer 32 and to input port 52 of reservation station 30 to send them these results.

According to some embodiments of the present invention, one or more elements of processor core 15 may receive an indication of the width of the operands of a micro-instruction and may use this indication to reduce the power consumed by the processor core element when the width of the operands is narrow, for example less than or equal to 32 bits. In register alias table 28, power consumption may be reduced by not doing a look-up for the register alias in memory storing register aliases for micro-instructions having wide operands e.g. floating point or multi-media extensions (MMX™) operands. This will be described in more detail hereinbelow.

For other processor core elements, power consumption may be reduced by not using components of the processor core element that are dedicated to handling bits 32 and up. The following description with respect to FIG. 3 uses an exemplary processor core element. Although the scope of the present invention is not limited in this respect, the exemplary processor core element may be reservation station 30, an execution unit in execution system 20 and/or reorder buffer 32. As will be understood by persons of ordinarily skill in the art, not all elements of processor core 15 will necessarily comprise all the components shown in the exemplary processor core element.

Figure 3:
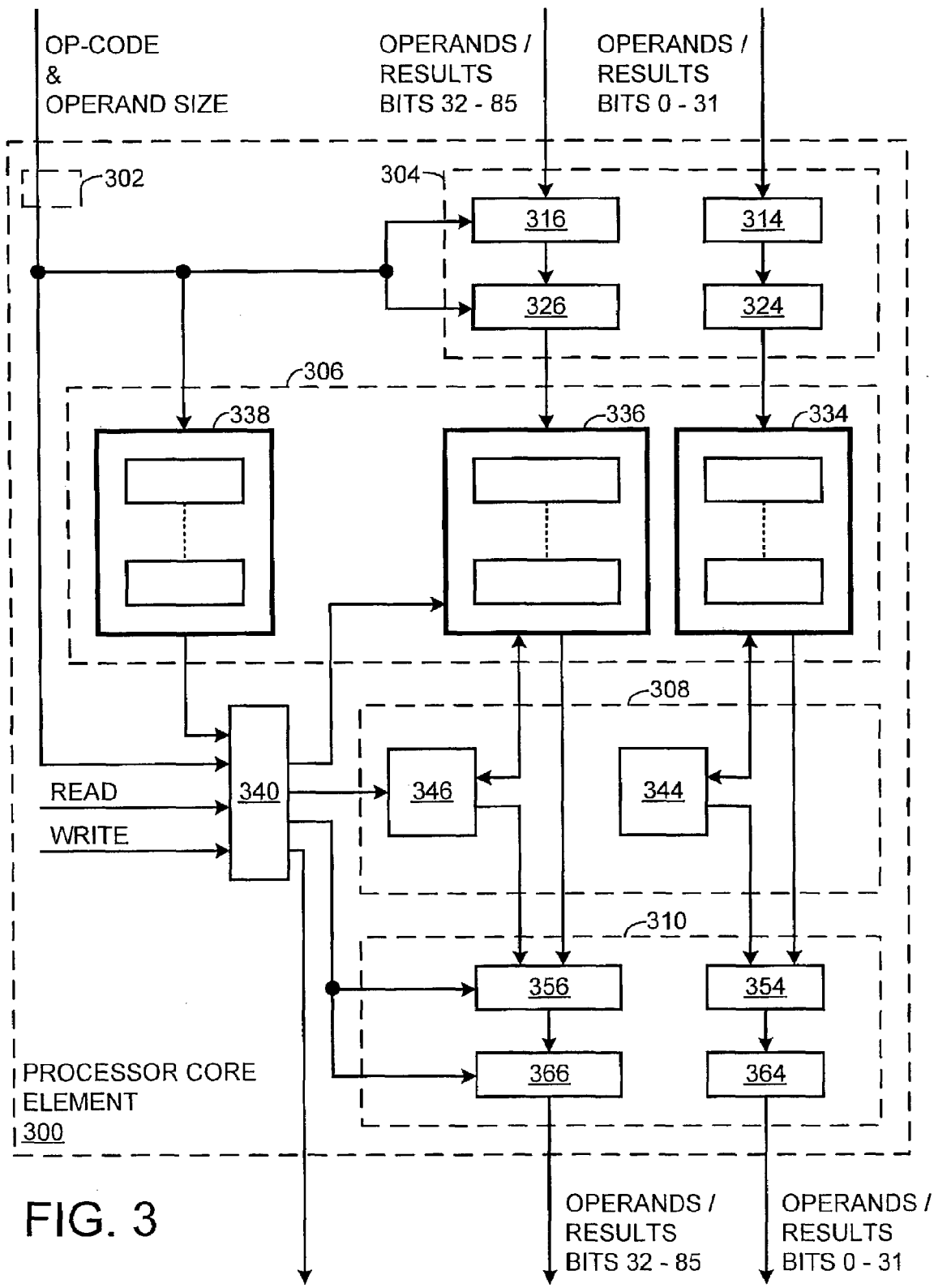
FIG. 3 is a simplified block-diagram illustration of a processor core element according to some embodiments of the present invention.

FIG. 3 shows an exemplary processor core element 300 according to some embodiments of the present invention. Processor core element 300 may comprise a port 302 to receive an indication of the width of the operands. Port 302 may also receive other information, such as, for example, the op-code of the micro-instruction, although the scope of the present invention is not limited in this respect. Processor core element 300 may also comprise one or all or any combination of the following components: an input source port 304, a memory 306, internal logic circuitry 308, and an output source/results port 310. Processor core element 300 may comprise more than one input source port 304 and/or more than one memory 306 and/or more than one internal logic circuitry 308 and/or more than one output source/result port 310. The manner in which each of these components may reduce the power consumed by the processor core element when the width of the operands is narrow, for example less than or equal to 32 bits, will now be described.

Input source port 304 may comprise an input buffer group 314 to receive bits 0–31 of the operands, and an input buffer group 316 to receive bits 32–85 of the operands. Input source port 304 may also comprise input logic circuitry 324 to handle bits 0–31 of the operands, and input logic circuitry 326 to handle bits 32–85 of the operands. Although the scope of the present invention is not limited in this respect, input logic circuitry 324 and/or 326 may comprise multiplexers. When the signals received via port 302 indicate that the width of the operands is narrow, for example less than or equal to 32 bits, input source port 304 may put input buffer group 316 and/or input logic circuitry 326 into a low-power state without interfering with the operation of input buffer group 314 and input logic circuitry 324. Throughout the specification and claims, the term "low-power" includes the possibility of no power.

Memory 306 may be a single-row memory such as, for example, a register, or may be a multiple-row memory such as, for example, a register file, random access memory (RAM), content associated memory (CAM), and the like. Each row of memory 306 may comprise a portion 334 to store bits 0–31 of the output of input source port 304, a portion 336 to store bits 32–85 of the output of input source port 304, and a portion 338 to store an indication of the width of the data being stored and possibly other information. Although the scope of the present invention is not limited in this respect, the width indication may have a value of 0 for data of up to 32 bits in width and a value of 1 for data larger than 32 bits in width, or vice versa.

Processor core element 300 may comprise control circuitry 340 coupled to memory 306. Control circuitry 340 may receive from port 302 an indication of the width of the operands. When control circuitry 340 receives a "write" command to write data from input source port 304 to memory 306, and the signals received via port 302 indicate that the width of the data is narrow, for example less than or equal to 32 bits, control circuitry 340 may put portion 336 into a low-power state without interfering with the operation of portion 334.

Similarly, when control circuitry 340 receives a "read" command to read data from memory 306, and the entry in portion 338 corresponding to the data indicates that the width of the data is narrow, for example less than or equal to 32 bits, control circuitry 340 may put portion 336 into a low-power state without interfering with the operation of portion 334.

Internal logic circuitry 308 may comprise logic circuitry 344 to handle bits 0–31 of the data read from memory 306 and logic circuitry 346 to handle bits 32–85 of the data read from memory 306. When control circuitry 340 receives a "read" command to read data from memory 306 into internal logic circuitry 308, and the entry in portion 338 corresponding to the data indicates that the width of the data is narrow, for example less than or equal to 32 bits, control circuitry 340 may put portion 336 and/or logic circuitry 346 into a low-power state without interfering with the operation of portion 334 and logic circuitry 344.

Similarly, when control circuitry 340 receives a "write" command to write output from internal logic circuitry 308 into memory 306, and the output is of a narrow width, for example less than or equal to 32 bits, control circuitry 340 may put portion 336 and/or logic circuitry 346 into a low-power state without interfering with the operation of portion 334 and logic circuitry 344.

Output source/results port 310 may comprise output logic circuitry 354 to handle bits 0–31 of the data received by output source port 310 and output logic circuitry 356 to handle bits 32–85 of the data received by output source port 310. Although the scope of the present invention is not limited in this respect, output logic circuitry 354 and/or 356 may comprise multiplexers. Output source/results port 310 may also comprise an output buffer group 364 to send bits 0–31 of the data, and an output buffer group 366 to send bits 32–85 of the data.

When control circuitry 340 receives a command to output data from processor core element 300 from memory 306 or internal logic circuitry 308 via output source/results port 310, and the data is of a narrow width, for example less than or equal to 32 bits, output source/results port 310 may put output buffer group 356 and/or output logic circuitry 366 into a low-power state without interfering with the operation of output buffer group 354 and output logic circuitry 364.

It will be appreciated by persons of ordinary skill in the art of processor design that many other configurations for processor core element 300 are possible, all of which are within the scope of the present invention. For example, some components of processor core element 300 may not have a separate portion dedicated to handling the high bits. However, it will be appreciated by persons of ordinary skill in the art that the more components of processor core element 300 that comprise separate portions dedicated to handling the high bits that may be put into a low-power state when the data being handled is narrow, the greater the savings in power consumption.

Referring again to FIG. 2, register alias table 28 may allocate registers to be used by the micro-instructions and may maintain one or more look-up tables relating the allocated registers and the aliases of the registers as used by the macro-instructions or micro-instructions. Although the scope of the present invention is not limited in this respect, the look-up tables may be content associated memory (CAM). Register alias table 28 may comprise separate look-up tables for the registers allocated to micro-instructions having narrow operands, for example up to 32 bits in width, and for the registers allocated to micro-instructions having wide operands, for example up to 86 bits in width. Other processor core elements may send register alias table 28 a pointer to a particular register alias to request from register alias table 28 the identifier of the corresponding allocated register.

As explained hereinabove, reservation station 30 may dispatch micro-instructions to execution system 20 out of order. When reservation station 30 dispatches a micro-instruction to execution system 20, it notifies register alias table 28 of such, as indicated by allow 80. Register alias table 28 may then follow the progress of the micro-instruction, updating the look-up tables as the micro-instruction is executed by execution system 20 and once again when the results are ready in reorder buffer 32. For example, when reorder buffer 32 places results in the retired register file, it notifies register alias table 28 of such, as indicated by arrow 82.

According to some embodiments of the present invention, when register alias table 28 receives a request for the identifier of an allocated register, register alias table 28 may determine whether the micro-instruction for which this request is being made has narrow or wide operands, using the width indicator that is associated to the micro-instruction. If the micro-instruction has narrow operands, then register alias table 28 may save power by disabling the logic for the look-up tables for wide registers, so that oily look-up tables for narrow registers are searched. Register alias table 28. may also save power by disabling any other internal logic associated with wide registers.

According to some embodiments of the present invention, it is possible to make the processor core behave as though it is a 32-bit machine when the operands of a micro-instruction are no greater than 32 bits in width.

Although the foregoing description uses the example of a processor, embodiments of the present invention are equally applicable to parts of the processor other than the processor core, and to integrated circuits having other logic circuits, for example, bus controllers, timers, and other such peripherals. Embodiments of the present invention may be applied to any integrated circuit having a logic circuit that handles variable-width data.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
   searching either one of a first look-up-table relating to registers allocated to be used by narrow micro-instruction operands and a second look-up table relating to registers allocated to be used by wide micro-instruction operands based on an indication of a width of operands of a micro-instruction to be handled; and
   causing a component of a processor core element that is able to handle wide data to behave as though said component handles only narrow data when the operands of said micro-instruction are narrow.

2. The method of claim 1, wherein causing said component to behave as though said component handles only narrow data comprises puffing a portion of said component in a low-power state, wherein said portion is dedicated to high bits of wide data.

3. The method of claim 1, further comprising:
   sending said indication to said processor core element.

4. The method of claim 1, wherein said wide data is data of up to 86 bits, and said narrow data is data of up to 32 bits.

5. A method comprising:
   searching either one of a first look-up-table relating to registers allocated to be used by narrow micro-instruction operands and a second look-up table relating to registers allocated to be used by wide micro-instruction operands based on an indication of a width of operands of a micro-instruction to be handled; and
   causing a processor core element that is able to handle wide data to behave as though said processor core element handles only narrow data when the operands of said micro-instruction are narrow.

6. The method of claim 5, wherein said wide data is data of up to 86 bits, and said narrow data is data of up to 32 bits.

7. An apparatus comprising:
   a processor core comprising a register-alias-table including a first look-up-table relating to registers allocated to be used by narrow micro-instruction operands and a second look-up table relating to registers allocated to be used by wide micro-instruction operands, wherein said register-alias-table is able to search either one of said first and second look-up-tables based on an indication of a width of operands of a micro-instruction to be handled; and
   an element able to handle wide data, wherein said element comprises a portion dedicated to handling high bits of said wide data, and said processor core is able to put said portion in a low-power state when said indication indicates that data being handled by said element is narrow.

8. The apparatus of claim 7, wherein said element comprises a port and said portion is a buffer group.

9. The apparatus of claim 7, wherein said element comprises a port and said portion is logic circuitry associated with said port.

10. The apparatus of claim 7, wherein said element comprises internal logic circuitry.

11. The apparatus of claim 7, wherein said element comprises a memory and said portion is able to store said high bits.

12. The apparatus of claim 7, wherein said element is an execution unit.

13. The apparatus of claim 7, wherein said element is a reservation station.

14. The apparatus of claim 7, wherein said element is a reorder buffer.

15. An apparatus comprising:
   a processor core element comprising a memory to store a first look-up-table relating to registers allocated to be used by narrow micro-instruction operands and a second look-up table relating to registers allocated to be used by wide micro-instruction operands,
   wherein said processor core element is able to search either one of said first and second look-up-tables based on an indication of a width of operands of a micro-instruction to be handled.

16. The apparatus of claim 15, wherein said memory is content associated memory.

17. An apparatus comprising:
   a user-input device; and
   a processor comprising:
      a register-alias-table including a first look-up-table relating to registers allocated to be used by narrow micro-instruction operands and a second look-up table relating to registers allocated to be used by wide micro-instruction operands, wherein said register-alias-table is able to search either one of said first and second look-up-tables based on an indication of a width of operands of a micro-instruction to be handled; and
      a processor core element able to handle wide data, wherein said element comprises a portion dedicated to handling high bits of said wide data, and said processor core is able to put said portion in a low-power state when said indication indicates that data being handled by said element is narrow.

18. The apparatus of claim 17, wherein said element comprises a port and said portion is a buffer group.

19. The apparatus of claim 17, wherein said element comprises a port and said portion is logic circuitry associated with said port.

20. The apparatus of claim 17, wherein said element comprises internal logic circuitry.

21. The apparatus of claim 17, wherein said element comprises a memory and said portion is able to store said high bits.

22. The apparatus of claim 17, wherein said element is an execution unit.

23. The apparatus of claim 17, wherein said element is a reservation station.

24. The apparatus of claim 17, wherein said element is a reorder buffer.

25. An apparatus comprising:
   a user-input device; and
   a processor comprising a processor core element including a memory to store a first look-up-table relating to registers allocated to be used by narrow micro-instruction operands and a second look-up table relating to registers allocated to be used by wide micro-instruction operands,
   wherein said processor core element is able to search either one of said first and second look-up-tables based on an indication of a width of operands of a micro-instruction to be handled.

26. The apparatus of claim 25, wherein said memory is content associated memory.

* * * * *